United States Patent

South et al.

[15] 3,705,331

[45] Dec. 5, 1972

[54] AC GENERATOR SYSTEM INCLUDING DIFFERENTIAL PROTECTION OF EXCITER

[72] Inventors: William H. South, McKeesport; Thayer L. Dillman, North Versailles, both of Pa.

[73] Assignee: Westinghouse Electric Corporation, Pittsburgh, Pa.

[22] Filed: March 16, 1972

[21] Appl. No.: 235,276

[52] U.S. Cl...................317/13 R, 317/27 R, 322/25
[51] Int. Cl................................................H02h 7/06
[58] Field of Search...........317/27, 13 R; 322/25, 28, DIG 2, 322/19

[56] References Cited

UNITED STATES PATENTS

| | | | |
|---|---|---|---|
| 3,009,090 | 11/1961 | Stearley et al. | 322/25 X |
| 3,027,509 | 3/1962 | Lamaster | 322/25 |
| 3,371,235 | 2/1968 | Hover | 310/68 R |
| 3,652,920 | 3/1972 | South et al. | 322/19 |

*Primary Examiner*—James D. Trammell
*Attorney*—A. T. Stratton et al.

[57] ABSTRACT

A differential protection system is connected to detect and indicate faults in an exciter by comparing signals developed from the exciter field and from the generator armature. A first signal is developed representing the magnitude of the voltage on the exciter field winding and a second signal is developed representing the vectorial sum of the current and voltage on the armature winding. These signals are compared and a fault indication produced when the magnitude of their difference is at least of a certain value. The differential protection in brushless exciters permits avoiding the use of a fuse in series with each diode of a rotating rectifier.

6 Claims, 1 Drawing Figure

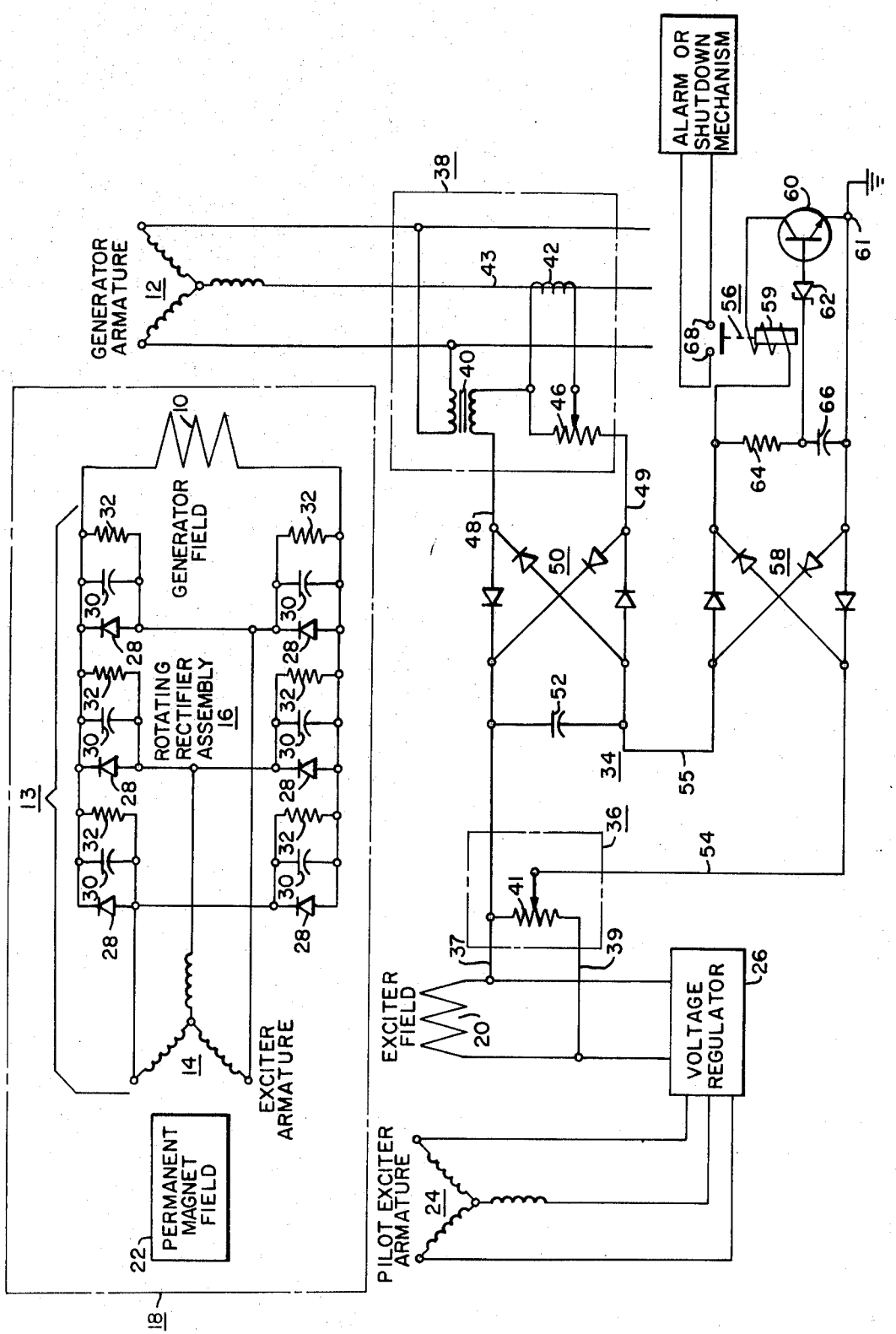

3,705,331

AC GENERATOR SYSTEM INCLUDING DIFFERENTIAL PROTECTION OF EXCITER

BACKGROUND OF THE INVENTION

1. Field of the Invention

This invention relates to electrical generation systems.

2. Prior Art

In present generator excitation systems, if a fault occurs in the exciter, there is no remote indication of any trouble. Serious faults can occur from a variety of causes in the various known types of exciters and endanger the entire system if it is not promptly shut down.

A form of exciter is that known as a brushless exciter in which the AC armature winding of the exciter and a rectifier assembly rotate on the same shaft for direct supply of field current to the generator field winding without slip rings or brushes. Normally several semiconductor diodes are connected in parallel for each A.C. phase and as used heretofore each diode has a separate fuse element in series therewith so as to avoid a direct short between the exciter armature and the generator field upon a shorting failure of the diode, to which semiconductor diodes are susceptible. Hoover U.S. Pat. No. 3,371,235 is illustrative as to known brushless exciters. It can be seen that the use of a fuse in series with each diode can be expensive both in terms of the components themselves and because of the additional rotating mass. Such fuses completely isolate an individual shorted diode and do not provide protection for any fault occurring ahead of the fuses, e.g., in the exciter armature winding. If the latter type of fault is present, although in present systems there is a very low probability of that, destruction of the exciter can occur or the voltage regulator tries to work harder but may not, as such voltage regulators are presently devised, give a forcing alarm.

Consequently, the prior art does not provide exciter systems that are protected against catastrophic failure that could otherwise occur in rare instances.

SUMMARY OF THE INVENTION

In accordance with this invention, a differential protection system is connected to detect and indicate faults in an exciter by comparing signals developed from the exciter field and from the generator armature. A first signal is developed representing the magnitude of the voltage on the exciter field winding and a second signal is developed representing the vectorial sum of the current and voltage on the armature winding. These signals are compared and a fault indication produced when the magnitude of their difference is at least of a certain value.

The effect of gain in the exciter is compensated for by a resistive impedance connected within the means for developing the referred to first signal. Also, the effect of the synchronous reactance of the generator is compensated for by a resistive impedance connected across the means developing the second referred to signal. These resistive impedances can be made adjustable to provide a single differential protection unit that can be adapted for various machine characteristics.

It is desirable to include, within the means for comparing the developed signals, a time delay means to insure the required minimum difference between the signals endures a given minimum time before a fault is indicated.

Although the differential protection scheme of the invention may be used in connection with any type of exciter, it is especially suitable for use in brushless excitation systems where the rotating diodes may now be used without fuse elements in series with each one but with reliance upon the differential protection system to provide a fault signal.

THE DRAWING

The single FIGURE of the drawing is a circuit schematic of one embodiment of the present invention.

DESCRIPTION OF THE PREFERRED EMBODIMENTS

Referring to the drawing, there is shown an A.C. generator system including an alternating current generator with a DC field winding 10 and an AC armature winding 12 (here shown as a three phase winding) to which the field winding is inductively related. An exciter 13 is connected with the field winding 10 of the generator to produce DC excitation thereon. While various types of exciters may be used, the description of the invention will be presented in connection with a brushless system in which the unit comprising the exciter armature 14, a rotating rectifier assembly 16, and the generator field winding 10 are parts of a commonly rotated unit 18. The exciter 13 also has a DC field winding 20 that is part of the stationary structure.

In the example shown, the exciter armature 14 receives its field energization from a pilot exciter that includes a permanent magnet field member 22 in the rotating unit 18 that is electromagnetically coupled to a stationary armature 24 to apply a pilot voltage to voltage regulator 26. The regulator 26 may be of a known type to apply a controlled DC voltage to the exciter field winding 20.

The electrical output of exciter armature 14 is applied to a rotating rectifier assembly 16 that includes at least one diode 28 for rectification of each half cycle of the AC wave in each phase. In accordance with known practice, each of the diodes 28 may have connected across it a voltage suppressor capacitor 30 and a resistor 32.

The apparatus also includes a differential protection system 34 in accordance with this invention. This system includes a first means 36 to develop a first signal representing the magnitude of the voltage on the exciter field winding. This first signal may be developed either by direct connection of lines 37 and 39 across the exciter field winding, as shown, or by development of a current across a low resistance in series with the exciter field winding. Resistance 41, which may be adjustable, is connected across lines 37 and 39 to compensate for exciter gain.

There is also provided a second means to develop a second signal representing the vectorial sum of the current and voltage of one phase of the AC armature winding 12. For this purpose a voltage transformer 40 is used to develop a voltage representative of the magnitude of voltage in the AC armature and a current transformer 42 is used to sense the current in an armature lead 43 and develop a voltage signal that corresponds thereto. The secondary windings of the two transformers are joined at point 44 to produce a vectorially added signal in opposition to the signal developed by means 36. The current transformer 42 is connected across a resistance 46, which may be adjustable, to compensate for the synchronous reactance of the generator.

An A.C. signal developed by the transformers 40 and 42 on lines 48 and 49 is rectified, such as by the rectifier bridge 50 which is preferably followed by a filter capacitor 52, before combination with the DC signal developed from the field of the exciter.

The signals that are developed for the differential protection system are signals normally developed for use in the voltage regulator 26 and the same sensing units may be used for both the differential protection system 34 and the voltage regulator 26.

The result of the combination thus far described is to provide on lines 54 and 55, extending respectively from the tap on the resistor 41 in the first sensing means and one side of the filter capacitor 52, a signal that represents the difference in the two generated signals from means 36 and 38.

A differential relay 56 is provided that is responsive to the difference signal when the latter is of sufficient magnitude. In this embodiment the differential relay 56 has a second rectifier bridge 58 in front of it across lines 54 and 55. The rectifier bridge 58 ensures operability of the system regardless of the polarity of the sensed difference signal. Coil 59 of the relay 56 has a transistor 60 in series with it to a point 61 of reference potential. A Zener diode 62 is connected to the base of transistor 60. A resistance 64 and capacitance 66 are connected between the input side of coil 59 and point 61 for introducing a predetermined time delay in order to insure that the unit 34 is not susceptible to brief transients that are of such limited duration as to be tolerable. The cathode of Zener diode 62 is connected to a point between elements 64 and 66. Consequently, the voltage is permitted to build up on the cathode of the Zener diode 62 for the time constant of the time delay elements 64 and 66. When the Zener diode 62 breaks down it is only then that the transistor 60 turns on to provide a conductive path through the relay coil 59. Contacts 68 of relay 56 are then closed to cause a fault indication signal to be supplied to alarm or shutdown mechanism 70 to shut down the exciter or otherwise provide indication to personnel that a fault exists. Other known configurations of elements may be used to energize the relay 56.

The differential protection system 34 provides a means to monitor continually the condition of the exciter armature 14 and rotating rectifier assembly 16 in brushless exciters. Although system 34 may be used with other types of exciters, it is particularly advantageous in the illustrated application because it permits doing without a fuse in series with each diode 28. Thus in preferred forms of the invention the diodes 28 are directly connected, without fuses, between the exciter armature winding 14 and the generator field winding 10. The cost of fuses is high enough, and the reliability of present diodes is high enough, that the risk of having the machine shut down by a diode failure may be worth running. In past brushless exciters, the fuse would isolate a single faulted diode in a parallel connection and the machine could keep operating although periodic maintenance was necessary to replace fuses.

The circuit as described does not take into account the effect of saturation on either the exciter or generator. Normally this effect should not require consideration because the saturation effects can be approximated by a straight line (i.e., linear circuit elements). However, it may conceivably be desirable, on some units, to obtain greater sensitivity by adding non-linear circuit elements to correct for the non-linear saturation of the machine. These non-linear elements could be added in series with the output of either element 41 and 52, or both. A Zener diode non-linear element could be used similar to the manner in which a Zener diode is used in South U.S. Pat. No. 3,590,277.

We claim:

1. An A.C. generator system including differential protection of exciter elements comprising: an alternating current generator having inductively related D.C. field winding and A.C. armature winding; an exciter connected with said field winding of said generator, said exciter having a D.C. field winding; a differential protection system including first means to develop a first signal representing the magnitude of the voltage on said exciter field winding, second means to develop a second signal representing the vectorial sum of the current and voltage of said A.C. armature winding, and third means to produce a third signal representing the difference in magnitude of said first and second signals.

2. The subject matter of claim 1 wherein: said first means includes a first resistive impedance of a magnitude to compensate for gain of said exciter; said second means includes a second resistive impedance of a magnitude to compensate for the synchronous reactance of said generator; and said first and second signals are both direct currents.

3. The subject matter of claim 2 wherein: said third means includes means responsive to a given minimum level of difference between said first and second signals to produce a fault indication, and said third means includes time delay means to limit the response of said responsive means to instances in which said minimum level of difference between said first and second signals endures for a given minimum time.

4. An A.C. generator system comprising:
an alternating current generator having inductively related D.C. field winding and A.C. armature winding; a brushless excitation system including an alternating current exciter and a rotating rectifier assembly, said rotating rectifier being connected with said generator field winding, said exciter having a D.C. field winding and an A.C. armature winding; a differential protection system connected to detect and indicate faults in said exciter by comparing signals developed from said exciter field and from said generator armature.

5. The subject matter of claim 4 wherein: said rotating rectifier assembly comprises at least one semiconductor diode directly connected between said exciter armature winding and said generator field winding.

6. The subject matter of claim 5 wherein: the direct connection of said diode to said windings is without any fuse element therein.

* * * * *